INVENTOR.
WELLS A. WEBB

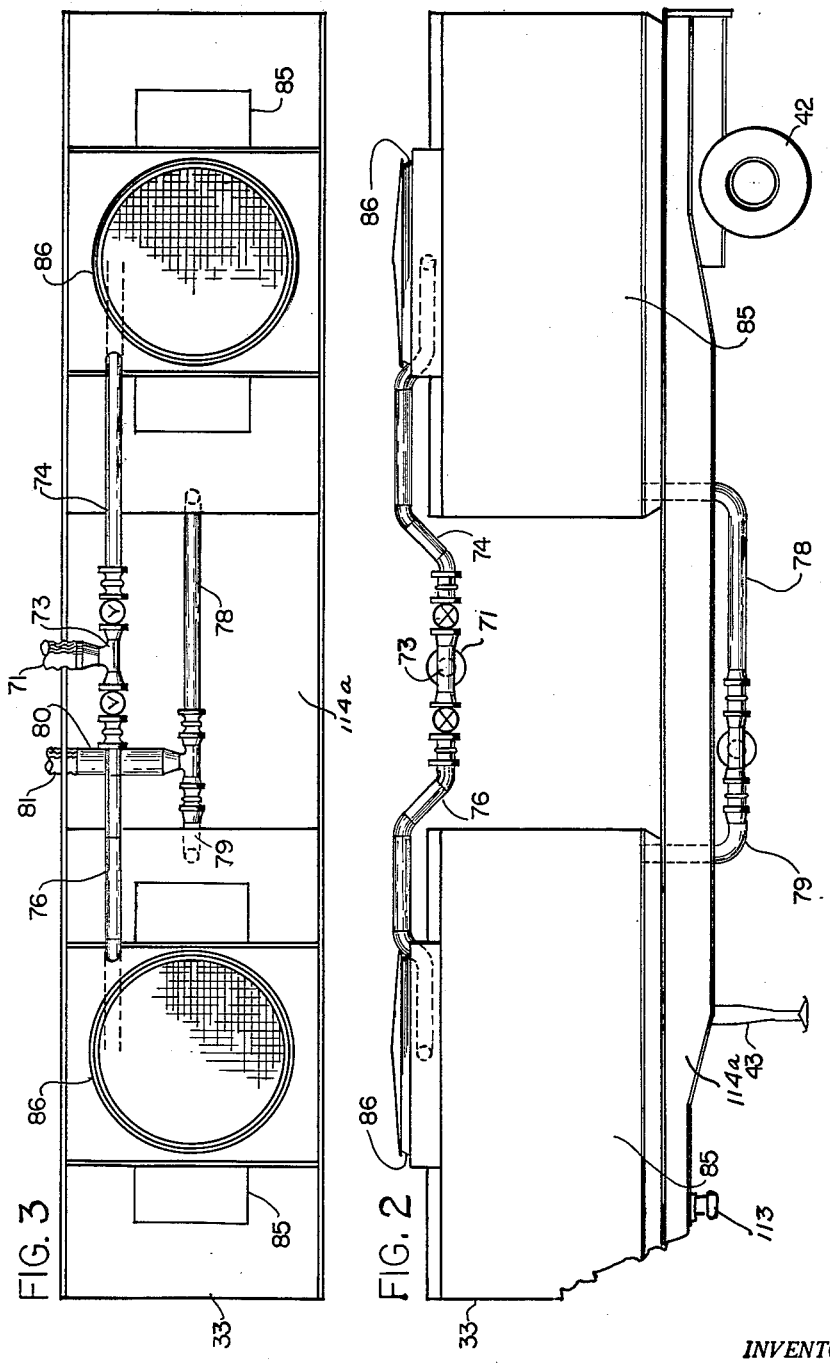

Nov. 12, 1963 W. A. WEBB 3,110,163
MOBILE VACUUM COOLING PLANT
Filed Dec. 21, 1959 5 Sheets-Sheet 3

INVENTOR.
WELLS A. WEBB

INVENTOR.
WELLS A. WEBB

BY Henry Gifford Hardy
Attorney.

Nov. 12, 1963 W. A. WEBB 3,110,163
MOBILE VACUUM COOLING PLANT
Filed Dec. 21, 1959 5 Sheets-Sheet 5

INVENTOR.
WELLS A. WEBB

United States Patent Office 3,110,163
Patented Nov. 12, 1963

3,110,163
MOBILE VACUUM COOLING PLANT
Wells A. Webb, Berkeley, Calif.
(1621 Via Vista Drive, Redlands, Calif.)
Filed Dec. 21, 1959, Ser. No. 861,060
11 Claims. (Cl. 62—237)

This invention relates to the precooling of produce and more particularly to apparatus for causing the evaporation of surface moisture primarily from leafy vegetables, such as lettuce and spinach, in such amounts as to effect a substantial cooling of the plant tissues when placed in a zone of controlled reduced pressure. Flowers, such as gladiolas and roses, and other similar plants which either have moisture on their external surfaces or possess an inner structure capable of yielding up water vapor at reduced pressures, may also be precooled so as to enable their preservation during storage and/or shipment after being cut and harvested.

The most economical and widely accepted method employed today to cause the evaporation of surface moisture from produce is the now well-known process of "vacuum cooling." The method and equipment for vacuum cooling which has won the greatest acclaim in agricultural regions is that of employing steam-jet pumps to remove the air and water vapor from a closed chamber in which the produce has been placed. It has long been recognized by the agricultural industry that steam-jet pumps are the most preferred means of vaporizing the moisture from large quantities of produce. However, the large size and tremendous cost of the steam generator and the associated equipment which together are required to operate stem-jet pumps has heretofore necessitated the establishment of substantial and permanent installations at certain central points in the various agricultural regions. This, of course, necessitated the bringing of the produce to the permanent plant for cooling and then transporting from the plant upon completion.

The use made of vacuum cooling by the growers of perishable crops is dependent upon the vagaries of unpredictable factors of the growing season, since it is weather which influences the rate of ripening in crops. An unusual increase in sunshine or temperature can accelerate the maturity of crops. The grower must then harvest the crop quickly and get it to market in order to preserve his investment. In this manner an abormal turn in the weather may result in demands for vacuum cooling in a particular area far in excess of the capacity of the established plants. When this happens crops go unharvested and rot in the fields, with consequent loss to the grower and ultimately to the public.

With the passing of time the agricultural industry has discovered that permanent vacuum cooling installations have been unable to fully satisfy the needs of the industry. Frequently, the large size of the individual farms and plantations, the distance of the particular field to be harvested from the permanent installation, the abandonment and idleness of such installations during the "off-season," the variable demands of perishable crop growers which are always subject to the unpredictable influence of weather and which may result in local demands for vacuum cooling service in excess of the capacity of the locally established vacuum cooling plant, and the expenditure of time and cost in the handling and intermediate trucking from the field where the crop is harvested to the permanent installation, have made it imperative to develop an improved mobile vacuum cooling plant which can be quickly moved from one location to another at great distances, frequently over hundreds of miles, from one location to another.

Amongst the numerous problems and difficulties which retarded the development of a movable, steam-operated complete plant, was the practical question of transporting the normally heavy and bulky equipment associated with the permanent type installation by means of pneumatic tired vehicles on the public highway, rail and other feasible modes of transportation. The use of railway cars was not feasible because of the lack of accessibility into remote areas and the considerable additional expense of laying new tracks. Use of the public highways appeared to be the most desirable, but presented the problems of satisfying the large and variable collection of laws, both Federal and State, relating to highway transportation, such as the limitations upon the size and weight of a vehicle and the load which it may carry. Further, where the weight or size of the vehicle or its load is excessive, many areas require travel to be made at reduced speeds of, for example, 15 miles per hour or less, thereby making sizable units impractical and uneconomical for mobile cooling plant purposes. To comply with these laws it was necessary to develop a plant which could be divided into mobile components, each of which would be capable of traveling at the legal speed for trucks and trailers; and hence would not measure more than eight feet wide, thirteen feet high and fifty feet long, and, in addition, would be so constructed as to insure that each component would remain within the legal weight limit.

Another essential requirement was the development of a mobile plant which was as nearly self-contained as practicable and which upon arrival at any desired location in the field could be made quickly operative and self-contained. Thus, fuel and water requirements had to be reduced to the lowest level, the need for elaborate ground preparations had to be eliminated, and the various components had to be constructed in a manner that would permit them to be readily coupled together so as to form a fully integrated steam vacuum cooling plant which would operate as effectively and as economically as the permanent-type establishment.

In addition, it was necessary to develop a plant which could process and cool sufficient quantities of produce without sacrificing the economies resulting from the pumping of a large volume of vapor from the vacuum cooling chamber containing a large quantity of produce, in securing the advantages of mobility. Further, it was necessary to develop a plant in which the number of components could be expanded or contracted to meet the particular needs of the specific locality of use.

It is an important object of the present invention, therefore, to provide a dependable mobile vacuum cooling apparatus for causing the evaporation of moisture from the external surfaces and the tissues of plants when subjected to reduced atmospheric pressures.

It is a further object of the present invention to provide mobile apparatus for vacuum cooling produce and similar moisture-bearing plants which utilizes the advantages of steam-jet aspirators for maintaining the vacuum chamber at a vacuum condition during the vacuum cooling operation.

It is also an object of this invention to provide mobile apparatus for vacuum cooling produce by steam jet means at the immediate growing area where such produce is harvested and without the need for intermediate handling and trucking.

It is another object of this invention to produce a mobile vacuum cooling apparatus which utilizes steam-jet pumps and the associated equipment necessary therefor, is substantially self-contained, requires a minimum of ground preparation prior to and during operation and which is constructed to eliminate the need for periodic water replenishment.

It is a still further object of this invention to provide a steam-jet operated, vacuum cooling apparatus which is reduced to pneumatic wheel-mounted components so as to be highly mobile, while at the same time remaining within the normal size, weight, and safety limitations for vehicles promulgated by most states for vehicles transported along the public highways at the standard speeds established for commercial trucks and trailers.

It is also an object of this invention to provide integrated mobile steam-jet operated, vacuum cooling apparatus in which the several components may be quickly and easily coupled together to form a complete, self-contained plant, and in which each component may be replaced or exchanged with similar units in the event of a breakdown, periodic maintenance, or other factors which might render a single component inoperative, and, in addition, may be added to or subtracted from in the number of the various component units so as to enable the apparatus to efficiently and effectively meet the produce cooling requirements of any particular locality.

It is a further object of the present invention to provide a mobile, steam-jet operated, vacuum cooling apparatus which utilizes two or more vacuum chambers which are placed in communication with each other by means of detachable, flexible conduits, so as to permit the vacuum established in one chamber to assist in reducing the pressure of another chamber.

It is also an object of this invention to provide a mobile, steam-jet operated, vacuum cooling apparatus in which the several vacuum chambers cooperate with an integrated multiple conveyor system for transporting produce into, through and out of each chamber.

It is another object of this invention to produce a mobile steam-jet operated vacuum cooling apparatus in which one of the components is a pneumatic wheel-mounted vehicle having a steam-generating boiler of sufficient size to meet the needs of a large volume flow of vapor from one or more vacuum cooling chambers and within the size and weight limits for such vehicles without destroying its mobility and which will not be subject to impairment caused by vibrations incurred while traveling along the highways at standard speeds.

It is also an object of this invention to provide a mobile apparatus for vacuum cooling produce which utilizes the combined advantages of both mechanical and steam means of pressurizing its vacuum chambers.

It is a further object of this invention to produce a mobile, steam-jet operated vacuum cooling apparatus for cooling produce by means of moisture evaporation wherein a primary pumping system is used for initially reducing the pressure within a vacuum chamber, a secondary pumping system is used for maintaining the vacuum chamber at a high vacuum condition during the cooling process and the two pumping systems are of such an independent nature from each other as to permit the high vacuum system to be placed in operation during the operation of the primary system as a supplement therto and as a means for reducing the time required to establish the desired vacuum condition within the vacuum chamber.

It is also an object of this invention to provide an apparatus for vacuum cooling produce in which a falling water type cooling component is utilized to provide cooling water for condensers for purposes of recovering water from the steam vapor and evaporated moisture discharged by the steam-jet aspirators.

It is another object of this invention to provide a steam-jet operated mobile vacuum cooling plant in which each of the vacuum chambers is of sufficient size to contain and cool the equivalent of one-half of a standard refrigerator railroad car of such produce.

It is still another object of this invention to provide a self-contained, mobile vacuum cooling plant which is self-contained and includes an electric generating means for operating auxiliary elements so that the plant may be put into full operation immediately upon arrival of the apparatus at the desired location, without dependence upon outside sources of power.

It is a still further object to provide mobile vacuum cooling means which can immediately respond to variable and unpredictable factors of the growing in widely separated areas to preserve harvested crops which would otherwise go unharvested and spoil or rot.

Another object is to provide a mobile vacuum cooling plant which can move with and to the harvesting as it occurs in the various areas.

Further objects are to provide a construction of maximum simplicity, economy, and ease of manufacture, also such further objects, advantages and capabilities as will fully appear and as are inherently possessed by the device and invention described herein.

Invention further resides in the combination, construction and arrangement of parts illustrated in the accompanying drawings, and while there is shown therein a preferred embodiment thereof, it is to be understood that the same is merely illustrative of the invention and that the invention is capable of modification and change, and comprehends other details of construction without departing from the spirit thereof or the scope of the appended claims.

Referring to the drawings:

FIGURE 2 is a side elevational view of a mobile cooling tower component.

FIGURE 3 is a plan view of the cooling tower component shown in FIGURE 2.

Figure 1:
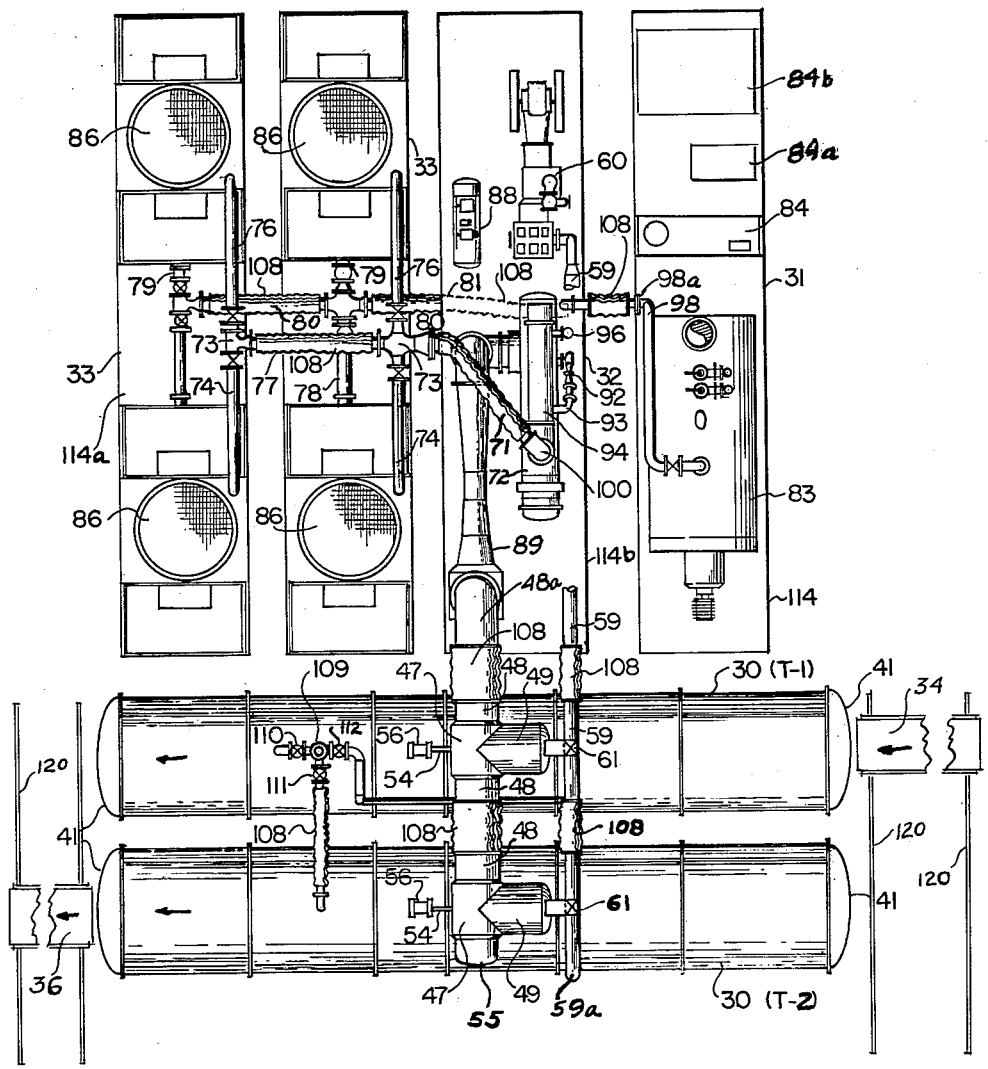
FIGURE 1 shows a plan view of the assembled components of the mobile vacuum cooling plant of the present invention positioned and coupled for substantially independent operation.

Referring now more particularly to the drawings, in which like reference numerals indicate like parts in the several views, the plant is comprised of several major component elements, each acting in conjunction with and dependent upon the others to make an integrated and substantially self-contained plant, and includes one or more vacuum chamber elements 30, a power unit 31, a vacuum pump and steam-jet booster 32 and one or more water coolers 33. Each of these elements is constructed to be a part of a mobile support structure, wheeled trailer or the like, shown generally as 114. Preferably they are all provided with wheels having pneumatic rubber tires 42, the axles for which are mounted at the rear end thereof, for highway travel. The front end of each mobile support is provided with parking supports 43 and a kingpin or other suitable coupling device 113 for attachment to conventional motorized highway tractors. In order to insure compliance with the various regulations pertaining to vehicular travel along the highway, each of these mobile components is constructed to be well within the arbitrary limitations of eight feet wide, thirteen feet high, and fifty feet long.

Although the invention can be made fully operative with the use of only one vacuum chamber 30 and one water cooler 33, in its preferred form it has been found that two of each of these provide the most effective use of the unit under normal circumstances. However, each of these elements and the entire unit have been so designed as to permit the coupling of additional elements into an integrated plant in order to meet unexpected demands which may suddenly arise.

In order to make the unit operate at a high level of efficiency, compressed air-operated, substantially vertically-lifting doors 41 are provided at both ends of each vacuum chamber 30, and a multiple conveyor system for transporting pallets 44a of produce 44—44' into, through, and out of the vacuum chamber 30. To accomplish this each vacuum chamber 30 is equipped with a permanent floor mounted belt conveyor 37 preferably, having weight carrying rollers 40, which is operated by means of a drive pulley 38 and idler pulleys 39. In addition, a removable feed conveyor 34 and a removable take-off conveyor 36 are provided which may be assembled on the ground for positioning in front of the respective entry and exit doors of each chamber 30 at the same height as the conveyor 37, so as to establish a continuous path for the rapid movement of the pallets of produce 44—44' into, in and out of the chambers.

Each vacuum cooling chamber 30 is a cylindrical tube preferably long enough to contain ten pallets at one time or a total of 320 cartons of produce or one-half of a standard refrigerator car load. This brings the over-all length of the chamber including the doors 41 to approximately forty-five feet. To accommodate the height of the floor conveyor 37 and the pallets loaded with produce 44, the chamber is required to be eight feet in over-all diameter. The wheels 42 are mounted on the support for the cylindrical tube so as to provide only the minimum clearance above the roadway of approximately twelve inches. The valve 49 carried by the chamber has to be of substantial size in order to give free passage of the attenuated water vapor which is at very low absolute pressure during the cooling operation. Accordingly, the section of the header manifold 48 carried by the chamber which connects to the high vacuum system is recessed into the top of the chamber 30 at right angles to the longitudinal axis of the chamber, and is welded securely in position. In this manner the over-all height of the wheeled chamber element is slightly over eleven feet, so that all dimensions are well within most highway requirements.

The section of a header manifold 48, which is secured to each vacuum chamber carries a poppet valve 49 at right angles thereto and in substantially the same horizontal plane. Valve 49 is comprised of a valve body 47, a casing 49a, a vertical internal spider 50 and the valve seat 51. The valve 49 has a vulcanized rubber gasket 53 for purposes of insuring an effective seal against the seat 51 when the valve is in the closed position. A shaft 54 for moving the valve 49 is secured at the center thereof, passes through the center of the spider 50 and is attached at its opposite end to a piston (not shown) located inside of the actuating cylinder 56. The valve 49 controls the communication of the interior of the vacuum chamber 30 with the header 48. The actuating cylinder 56 is operated by compressed air which is supplied from air compressor 88 through pipes 57 and 58 which respectively open and close the poppet valve 49. To close the end of the header 48 a suitable cap 55 is provided.

Also attached to the top of each vacuum chamber 30, and in communication therewith, is a section of the primer header 59 which is coupled in direct communication with the primary vacuum pump 60. The primary evacuation of the cooling chamber 30, whereby the atmospheric pressure therein is reduced to about twenty-eight inches of mercury of vacuum (based on a thirty inch standard barometer) is accomplished by means of poppet valve 61, in which the poppet disc 62 is attached to shaft 63, which in turn attaches to the piston (not shown) in the compressed air cylinder 64. The poppet valve 61 is provided with a rubber gasket 69 that seals against the disc 62 when the valve 61 is closed. The piston 66 is reciprocated by compressed air from air compressor 88 which is let into the cylinder 64 by means of the pipes 67 and 68, which respectively open and close the poppet valve 61.

Each of the water cooling trailers 33 contains two water coolers 85 of the falling water type mounted on a specially constructed flat bed 114a with pneumatic wheels 42 adjacent the rear end. These coolers provide a means of continuously cooling water which is distributed inside of the cooler by means of a manifold system whereby the water is caused to fall upon horizontally distributed baffles (not shown). As the water falls from the higher baffles to the lower baffles a counter current of air is simultaneously induced by means of a propeller type fan (not shown) which is located in the housing 86 above each water cooler 85 and which draws the heat out of the water by both contact and evaporation. A flexible connection 71 is provided to carry warm water from condenser 72 to connection 73 which is positioned between the two water coolers 85 to each trailer unit 33. The connection 73 is an X fitting that is capable of dividing the water entering therein between the separate water coolers 85 by means of pipes 74 and 76, respectively, and flexible connection 77 when a second cooling unit 33 is being used. The delivery of such warm water by means of the foregoing connections all takes place at a relatively high level. On the low level, pipes 78 and 79, respectively, are provided to receive the cooled water from the bottom of the water coolers 85 and deliver the same to the outlet pipe 80, from which the cooled water is drawn through the flexible couplings 81 by means of the suction created by pump 82 located on the vacuum pump and booster unit 32, and delivered to the condensers 91 and 94.

The power unit generally designated 31 is carried on its own separate trailer 114 and comprises a boiler or steam generator 83 capable of delivering steam at 150 pounds per square inch having a minimum rating of 250 boiler horsepower. It has been found that the use of a Scotch marine-type of boiler is most advantageous due to its comparatively light weight and the absence of bricks which would be subject to cracking and displacement resulting from the numerous vibrations incurred in any mobile unit. The power unit 31 may also be provided with an electric power generator 84 which may be driven by either a gasoline or diesel engine indicated as 84a. If diesel fuel is used for the engine 84a the same fuel can be used to fire the boiler 83. Diesel fuel for the operation can be carried in the fuel tank 84b. The generator 84 is utilized to provide immediate electric power to operate the water cooler fans in housings 86, the air compressor 88, the motor 87 which actuates the pump 82 and numerous auxiliaries, such as electric lights. It is to be understood that connecting boxes may be provided for connecting with established power lines if they are available as it might be more economical to buy the electric power rather than generate it. Other means than steam has been specifically used for driving the generator 84 so that electric power and compressed air may be made available immediately upon arrival at the desired location, thereby eliminating the loss of time which would be incurred if steam were used and the boiler 83 had to be brought up to pressure before electric lights or the air compressor 88 could become operative. With compressed air available in the initial stages, the doors 41 to the vacuum chambers 30 may be raised to the open position and the equipment which has been stored within the vacuum chambers such as the movable feed conveyor 34 and the removable take-off conveyor 36 together with the associated track and equipment may be removed and placed in position for use. It is apparent that the vacuum chambers furnish a convenient space for storing associated equipment during transportation.

Figure 5:
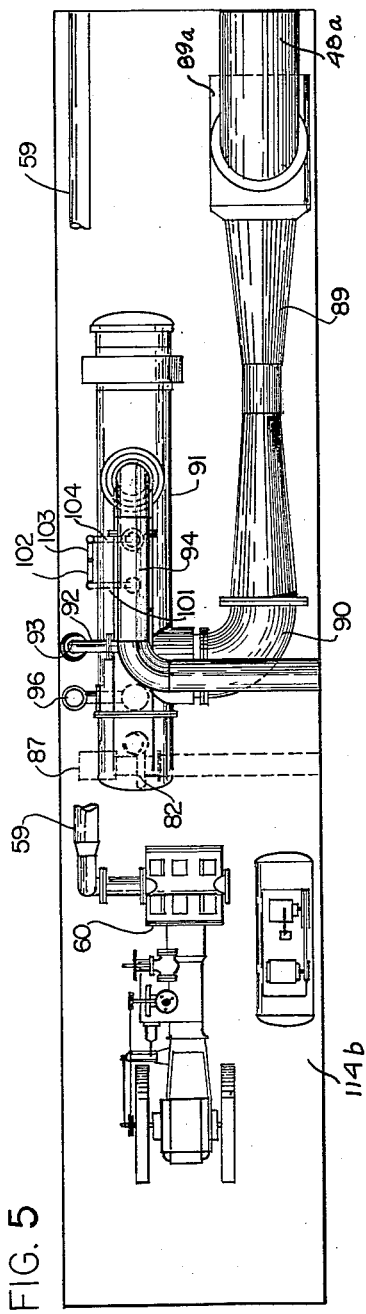
FIGURE 5 is a plan view of the vacuum producing component shown in FIGURE 4.
Figure 4:
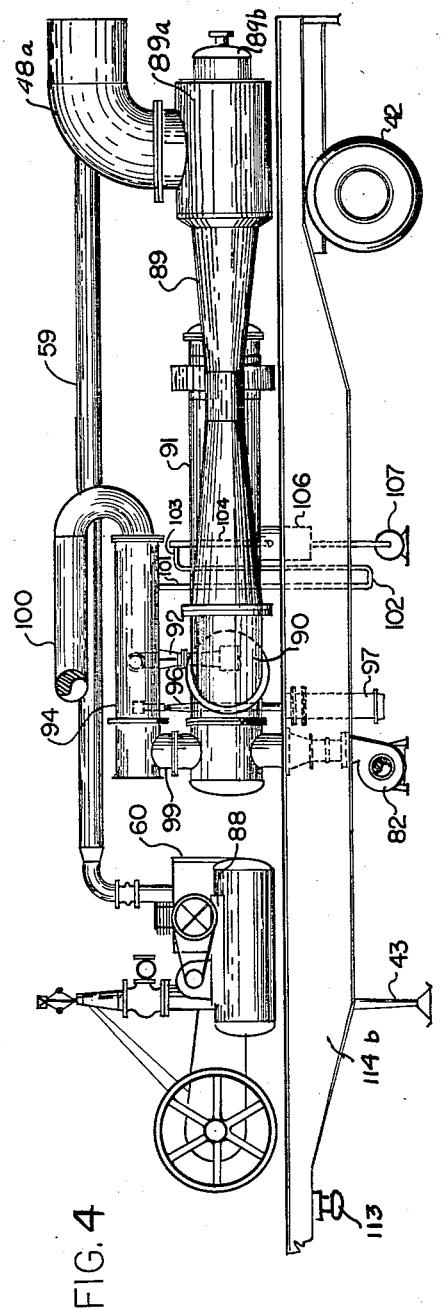
FIGURE 4 is a side elevational view of the mobile vacuum producing component showing the primary vacuum pump and the steam-jet high vacuum unit.

Referring now more particularly to FIGURES 4 and 5, the primary vacuum for removing air from the vacuum chambers 30 is provided by a steam driven reciprocating, or other suitable mechanical vacuum pump 60, which connects directly through line 59 to the header portions 59 of the primer. While there is shown in the figures a reciprocating steam engine 60 for mechanically producing a vacuum, it is obvious that the driving force may be electrical with electricity supplied by the generator 84, or by an internal combustion engine.

The primary vacuum pump reduces the atmospheric pressure in the vacuum chambers 30 to about 28 inches of mercury vacuum measure (based upon a 30″ standard barometer). The high vacuum required by the operation of this equipment (from 28″ of mercury to 29.9″) is provided by the booster jet 89 and is preferably of the venturi-type with three evactor jets within the entrance housing 89a, similar to that shown in the patent to Kasser, No. 2,344,151. During transportation the point of attachment of the steam line is covered by a cap 89b. The uncondensed vapors and air from the vacuum chambers, through the portion of the header 48 carried by this equipment 48a, is delivered to the elbow 90 and thence to the surface condenser 91. The uncondensed vapors and air are removed from the condenser 91 by means of a second stage steam jet 92 which discharges partially compressed vapors through the elbow 93 into a second stage surface condenser 94. The noncondensable air and water vapor remaining in the second stage condenser 94 are removed and compressed to atmospheric pressure by evactor jets 96, which deliver and discharge into the boiler feed water heat exchanger 97. It has been found advantageous to place all of the vacuum equipment, including the vacuum pump 60, the booster unit 89 and the condensers 91 and 94, together with their respective connections and the air compressor 88, all upon a single bed 114b as a component mobile integrated unit. However, it is to be understood that other positionings and even smaller trailers may be substituted.

The steam supplied to the evactor jets of the booster jet 89, as well as 92 and 96, is obtained from the boiler 83 by means of the pipeline 98, which is uncoupled at 98a on the power component for purposes of travel. The two surface condensers 91 and 94 are cooled by means of water from the cooling tower component 85 from the lower system 78 and 79, through the flexible connecting members 80 and 81, by means of pump 82.

Figure 7:
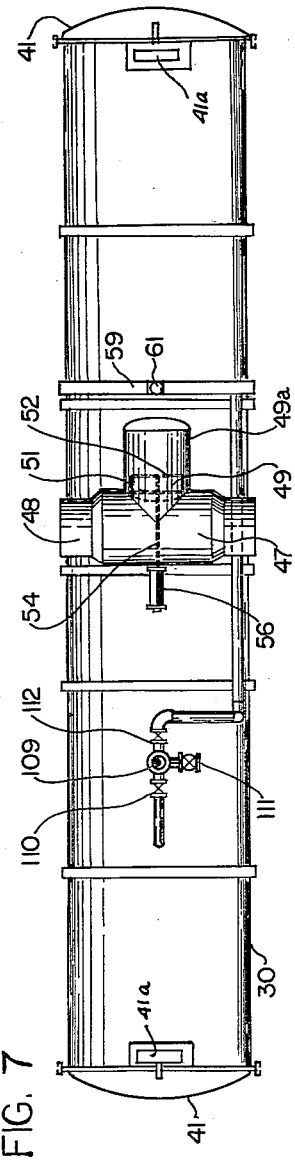
FIGURE 7 is a plan view of the vacuum cooling chamber component shown in FIGURE 6.
Figure 6:
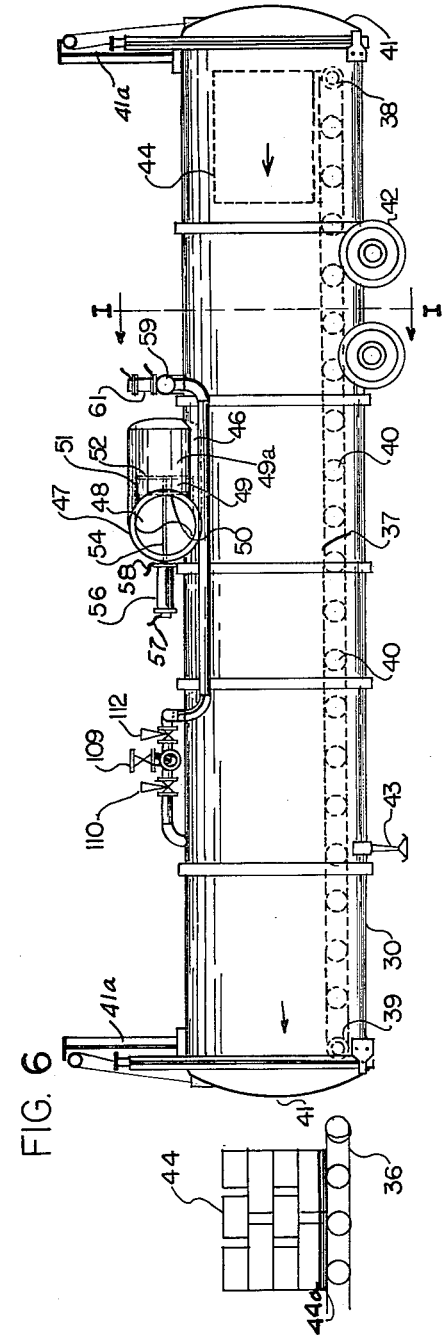
FIGURE 6 is a side view of a mobile vacuum cooling chamber component.
Figure 8:
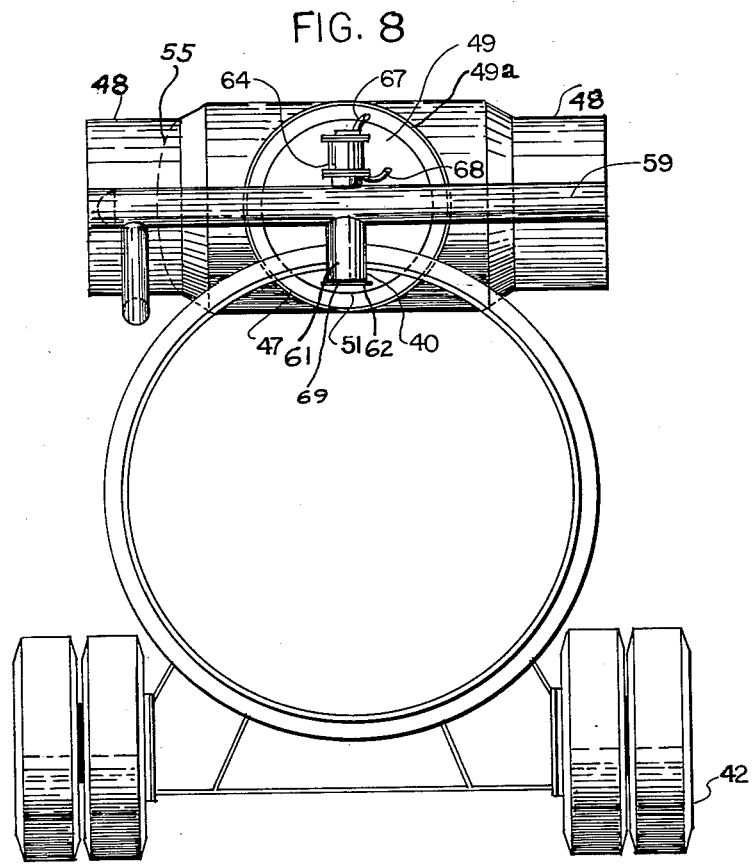
FIGURE 8 is a transverse section, partly in elevation, of one vacuum cooling chamber taken along line I—I of FIGURE 6, and looking in the direction of the arrows.

As shown in FIGURE 1, the plant is preferably composed of six wheeled vehicles drawn by truck tractors, two of them being vacuum chambers, such as shown in FIGURES 6 and 7, two of them being cooling tower components, such as shown in FIGURES 2 and 3, one of them being the vacuum equipment, such as shown in FIGURES 4 and 5, and the other being the power unit which is shown in the upper right-hand portion of FIGURE 1. Each component travels on the highway as a separate unit, uncoupled and completely separate and independent of any other component. Since the units are all mounted on pneumatic tires and conform with the length, width, height, and weight requirements of most of the State laws, the entire plant can be moved and transported along the established highways, over long distances at conventional highway speeds, and even to the most remote agricultural regions, with ease and rapidity. The same ease and rapidity permits this equipment to be positioned, connected and placed in operation as a self-contained vacuum cooling unit with a minimum of effort and time to produce and accomplish the objects hereinbefore set forth.

Upon arrival at the spot selected for operation, the various trailers are maneuvered into the relative positions shown in FIGURE 1, to wit, the steam boiler component is positioned so that its rear wheels are adjacent the vacuum chambers 30 when positioned, and as soon as the parking supports 43 for the front end of the trailer bed 114 are in proper position, the tractor is uncoupled and released. To level and steady the trailers during operation, jacks are supplied to the axles of the wheels 42. In addition to steadying the trailers of the several components, the jacks also perform the function of taking the weight off of the rubber-tired wheels and assist in leveling the equipment as required. Next the vacuum component shown in FIGURES 4 and 5 is backed into position along side of the power component and spaced therefrom so that two persons may easily pass therebetween. When lined up, the parking supports 43 are lowered into position and the tractor is then released and discharged. Here again the axle is supported by jacks inside of the wheels to steady the trailer during operation and to assist in the leveling as well as take the main weight from the pneumatic tires. Next, the two water tower units shown in FIGURES 2 and 3 are backed into parallel position, that is parallel to themselves as well as to the vacuum and power components, and spaced in the same manner. Here again, the spacing is sufficient for two persons to pass easily therebetween. When in proper position, the parking supports 43 are lowered to support the front end and the motorized tractor for each is released and discharged. Next, the two vacuum chambers are backed into position with their longitudinal axes substantially at right angles to the longitudinal axes of the other positioned components. The spacing is such that two persons can pass easily between any of the components. The rear or wheeled end of the vacuum chambers 30 is positioned adjacent the power unit, but they have to be lined up so that the respective header sections 48 carried by each of the vacuum chambers are substantially in line with the header section 48a on the vacuum component. It is apparent that if any one of the units or components is positioned and set, then all of the others are placed in relation to it and so that it is not necessary to start with the power component as described above.

As soon as the power component is in place the generator 84 can be started (or in lieu thereof connection made with an established power line), which will immediately permit lights to be used if the setup is made in failing sunlight or after dark, and since this trailer component carries with it its own fuel supply tank 84b, the boiler itself can be started. Sufficient boiler water is already in the boiler itself or carried in a storage tank, to permit starting up from a cold start. If necessary, additional storage tank capacity can be carried for boiler feed water on the flat part of the power trailer 114. The various flexible couplings generally designated 108, which are used to connect up the system into a single operating unit may either be carried directly upon the trailers to which they pertain, or stored within the vacuum chambers during transportation. Preferably, they are stored adjacent the point of actual use so that there is no time delay or sorting required to affix them in position for use immediately upon arrival at the location.

The flexible connections preferred for use in this system are those made by Lane-Wells and are standard articles of commerce. However, it is to be understood that any suitable type of flexible coupling may be employed. The steam line 98 from the boiler is connected to the steam line of the vacuum component with flexible couplings at 98a. The steam from this line is delivered to the mechanical vacuum pump 60 and is also delivered to the three steam evactor jets within the high vacuum system 89 and to the steam evactors 92 and 96. Flexible couplings are also used to connect the water cooler trailer components not only together but to the vacuum trailer components. In the lower system couplings 80 and 81 connect with the suction pump 82, while flexible couplings 71 and 77 connect the upper system with the condenser 94 through the curved connection 100 carried by the vacuum component. The primary vacuum header 59 carried by the vacuum trailer is attached by a flexible coupling 108 to that portion of the header 59 carried by the first of the vacuum chambers and then the other section of the second vacuum chamber is connected in the line also by means of a flexible coupling. The end of the primary header on the second or more remote vacuum chamber is capped and sealed as at 59a to make the system vacuum tight. The large high vacuum header sections 48 carried by each of the vacuum chambers 30 are also connected together by means of a flexible connection and connected to the header portion 48a carried by the vacuum trailer. When these connections are made, as well as the auxiliary connections such as the venting systems controlled by valves 109, 110, 111, and 112, there still remains the placing of the feed conveyor 34 and the take-off conveyor 36. As indicated earlier, these are standard roller conveyors set at the same height as the permanently fixed roller conveyor within each of the chambers, which are stored for transportation within the chambers themselves. For any two or more vacuum chambers only one feed conveyor 34 and one take-off conveyor 36 is ordinarily required. The single conveyors at either end can be made to function in connection with each of the chambers by laying parallel temporary tracks 120 and mounting the conveyors with suitable adjustable wheels for rolling on the tracks. Such wheeled supports can be folded against the conveyor for storage in transportation. By moving the conveyors on the tracks 120 they may be positioned at any time to feed into any vacuum chamber and to receive the pallets of cooled produce from the same or any chamber without reference to each other. Obviously, to get at the conveyors and couplings stored within the vacuum chambers during transportation, the vacuum-tight doors 41 must be moved to open position. As soon as the generator 84 is in operation, the motor on the air compressor 88 can be operated and compressed air from this source used from that time on to raise or lower the vacuum-tight doors 41 through the lift mechanism 41a at each end of the vacuum chamber.

It will be observed that each one of the mobile components can be positioned anywhere where the ground is reasonably level in a limited area without the necessity of permanent tracks, pits, concrete slabs or any other type of permanent installation. Likewise, the selected location may be completely independent of water and power line requirements.

When the plant is positioned and coupled, as shown in FIGURE 1, which by actual timing from arrival to the beginning of operation is substantially less than one hour, the operation of the plant is as follows: Pallets 44a loaded with 32 cartons of produce each, such as lettuce cartons, are placed one at a time on the feed conveyor 34 while the doors 41 of one of the vacuum chambers are raised in the open position. Actually, the delivery end of the feed conveyor 34 is much closer to the chamber conveyor 37 than is indicated in FIGURE 1, because it is not necessary to have the conveyors 34 and 36 adjacent the ends when the doors 41 are closed. Only a few inches separates the feed and take-off conveyors from the permanent conveyor 37 at either end. The feed, of course, is in the direction of the arrows. By means of these self-driven conveyors 34 and 37, the interior of the chamber is loaded to contain ten pallets in line along the longitudinal axis of the chamber. As soon as the vacuum chamber is loaded the doors 41 are lowered by the means 41a to the closed and sealed position at both ends, and the cylinder tightly sealed against air leaks. Of course, suitable recording thermometers are placed at strategic locations in the load of produce, as well as the space within the cylinder and these lead to visual dials and recording thermometers on the outside at the control panel. Also, instruments recording the inches of vacuum, both visually and recording, run to the control panel so that the operator knows at all times the pressure and temperature conditions of everything going on within the closed vacuum chamber. The poppet valves 52 in each chamber are of course closed. Since only one chamber is being loaded at this time, valve 61a in the header 59 can either be closed, or the poppet valve 69 closed in the vacuum chamber identified as T-2. The steam primer pump 60 is then started with the poppet valves 61 closed. The poppet valve in vacuum chamber T-1 is then opened and mechanically evacuated by the pump 60 through the header 59 to about 28" of mercury vacuum. As this condition approaches steam is admitted to the evactor jets in the high vacuum system within the housing 89a through the steam connection uncovered by cap 89b. Steam is also admitted to evactor jets 92 and 96 to place them in operation. The primer valve 61 in chamber T-1 is then closed and the large high vacuum poppet valve 52 is opened by means of the compressed cylinder 56. The vacuum within the loaded chamber T-1 is thereupon improved through the evacuating action of the booster jet 89, thus starting the removal of moisture and the vacuum cooling of the produce 44.

Lettuce, for example, coming to the plant at a temperature of from 65° to 70° F. will be cooled to the required average temperature of 34° under the influence of the vacuum produced by the booster jet 89 in approximately 20 minutes. When the load is finally cooled to the required temperature, the vacuum in the chamber T-1 has reached between 29.8" and 29.9" of mercury vacuum, or about 0.96 p.s.i. absolute to 0.049 p.s.i. absolute. The cooling of lettuce by vacuum is well-known in this art and is described in detail in various patents, including Kasser No. 2,344,151, Brunsing and Webb, No. 2,832,690, and others.

When the produce has been cooled to the proper temperature, the poppet valve 49 is closed. In the meantime the feed conveyor 34 has been moved on its track 120 to the second chamber 30 (T-2) and this chamber loaded with ten pallets of produce in the same manner as hereinbefore described. Also during the high vacuum cooling of chamber T-1, the doors of chamber T-2, after loading, are closed and sealed and the chamber primed by opening its corresponding poppet valve 61 to 28" of mercury vacuum. Thus, upon closing the high vacuum poppet valve 49, in chamber T-1, the corresponding poppet valve 49 in chamber T-2 is opened for the high vacuum cooling stage.

Chamber T-1 is then brought to atmospheric pressure by opening the vent valve 109 which is a part of the venting system hereinafter described. With the interior of chamber T-1 at approximately atmospheric pressure, the doors 41 are opened and the take-off conveyor 36 moved in its tracks 120 to receive the pallets from the interior of chamber T-1. In the same operation, a fresh load of ten pallets on feed conveyor 34 is moved into the chamber and the cycle, of course, is again repeated.

The vacuum which has been generated in chamber T-1 after cooling of the produce may be utilized to aid in the evacuation of the chamber T-2 or any other chamber which is utilized in the system and may be accomplished in the following manner: Assuming that the produce in chamber T-1 has completed its high vacuum cooling cycle and is ready to be vented, and also that chamber T-2 has been loaded and the doors 41 closed and sealed, the valve 112 is opened and the valve 109 is turned so that it directly communicates between valves 112 and 111 which latter valve has also been opened. This brings the interior of chamber T-1 in direct communication with the interior of chamber T-2. Because of the pressure differential in the chambers, air from chamber T-2 will flow through the passages to the interior of chamber T-1 and in approximately one minute both chambers will have equalized their pressures to about 15" of mercury vacuum. When this is accomplished, valve 111 is then closed and valve 109 opened in conjunction with valve 110, thereby causing chamber T-1 to be vented to the atmosphere. Chamber T-2 can then be completely primed by opening poppet valve 61 to the required 25" of mercury vacuum. By use of this venting system, the 15" of mercury vacuum accomplished in one minute would otherwise have taken the vacuum pump 60 several minutes to produce this degree of vacuum unaided.

The vapors from the chamber and attenuated air are drawn through the high vacuum booster jet 89, where it is mixed with the live steam. The discharge of the partially compressed water vapors at about 2 p.s.i. absolute, discharges through elbow 90 to the surface condenser 91. The uncondensed vapors and air are removed from the surface condenser 91 by means of the second stage steam jet 92, which in turn discharges its partially compressed vapors through line 93 to a second stage surface condenser 94. The noncondensable air and water vapor remaining in the second stage surface condenser 94 are removed and compressed to atmospheric pressure by evactor jet 96, which discharges into a boiler feed water heat exchanger 97. As has been stated earlier, only sufficient water for the boiler for initial operation is necessary as additional water for make-up is supplied during operation. The requirements for this purpose are moderate and are the function of the operation of the heat exchanger 97, which conserves about 70 gallons of hot water which originated in the produce, removed therefrom by vacuum, condensed and delivered as part of the water system of operation. Of this approximate 70 gallons, a substantial portion comes down as condenser water from condensers 91 and 94. Water from the condenser 94 is collected in the downward bend of the collector pipe 101 which is a syphon 102 where the water is returned by the upward bend 103 and a final downward bend 104 into the sump 106 and thence to pump 107. The water conservation system is more than sufficient to satisfy the water requirements of the boiler and the water coolers and any excess of distilled water from the heat exchanger 97 is by-passed into the cooling tower supply.

Upon completion of the produce cooling demand in the particular locality, the mobile vacuum cooling plant may be easily prepared for departure by removing the flexible connections 108, disconnecting the various wires and small conduits, disassembling the conveyors 34 and 36, stowing all of such gear in the vacuum chambers 30, closing the doors 41, attaching the various component trailers by means of the kingpin 113 to a motorized tractor, removing or retracting any parking supports 43 and support jacks that may have been used, and separately pulling the various trailer components away. All of this can be accomplished with ease in less than an hour after the finish of operations.

Thus, it is clear that a completely mobile, integrated, self-contained plant is provided, having a capacity of better than one standard refrigerator carload per hour, which, together with the methods of operation, fulfill the objectives hereinbefore stated.

I claim:

1. A mobile vacuum cooling plant wherein each of the components thereof is integrally mounted for separate and independent highway transport, comprising in combination, one or more vacuum cooling chamber components, water cooling components, a vacuum component having horizontal steam vacuum apparatus capable of reducing the atmospheric pressure within said cooling chamber components to establish a temperature just above the freezing point in leafy vegetables, a self-contained power component, each of said components having suitable connections and flexible couplings so that when the components are placed in planned juxtaposition they can be joined by said flexible couplings into a complete operating vacuum cooling plant without separation from its mounting.

2. A highway mobile produce vacuum cooling plant wherein a component thereof is integrally mounted with pneumatic-tired wheels for separate and independent motor transport, comprising in combination, one or more vacuum cooling chamber components, power driven means operable with said vacuum cooling chambers for feeding, loading and removing produce, water cooling components, a horizontal vacuum component having a two stage vacuum apparatus and condensers, and a self-contained power component having a steam generator, each of said components having suitable connections and flexible couplings operably connecting one to the other so that when the components are placed in planned juxtaposition and joined by said flexible couplings a complete operating vacuum cooling plant is established without separation from their independent wheeled mountings.

3. A mobile produce vacuum cooling plant wherein each of the components thereof is permanently mounted on pneumatic-tired wheeled trailers for separate and independent highway transport, comprising in combination, one or more vacuum cooling chamber components having power driven means carried thereby for feeding, loading and removing produce, water cooling components, a vacuum component having horizontal steam jet pump vacuum apparatus and condensers, and a self-contained power component having both steam and electric generators, each of said components having suitable connections and flexible couplings operably connecting one to the other so that when the components are placed in planned juxtaposition and joined by said flexible couplings a complete operating vacuum cooling plant is established without separation of the components from their independent wheeled mountings, said connections including a valve system, and a central control panel for operating said components as an integrated produce vacuum cooling plant.

4. A mobile produce vacuum cooling plant wherein each of the components thereof is integrally mounted on pneumatic-tired wheeled trailers for separate and independent motor transport, comprising in combination, one or more vacuum cooling chamber components, power driven means operable with said vacuum cooling chambers for feeding, loading and removing produce, water cooling components, a vacuum component having primary means for reducing the atmospheric pressure in said cooling chambers to about 28 inches of mercury vacuum measure (based on a 30" standard barometer) and a secondary means for further reducing said pressure to about 29.9 inches of mercury vacuum measure (based on a 30" standard barometer), a power component having a steam generator capable of delivering steam at a pressure sufficient to operate said secondary means, suitable connections and flexible couplings carried by said components so that when the components are placed in planned juxtaposition they are joined by said flexible couplings into a complete operating vacuum cooling plant, valve means for venting the interior of said chambers to the atmosphere, said valve means including a valve system for utilizing pressure differentials between the said cooling chambers, and a central control panel for operating said components as an integrated produce vacuum cooling plant.

5. A mobile produce vacuum cooling plant wherein the components thereof are permanently mounted on pneumatic-tired wheeled trailers for separate and independent unitary transport, comprising in combination, one or more vacuum cooling chamber components having power driven means for feeding, loading and removing produce, water cooling components, a vacuum component having both mechanical and steam vacuum apparatus, condenser means operable with said vacuum apparatus for recovery of the moisture and exhaust steam and returning the same to the steam generator as make-up water, with the excess going to the water cooling components, and a power component having both steam and electric generators and fuel and water storage, each of said components having suitable connections and flexible couplings carried thereon so that when the components are placed in juxtaposition they can be joined by said flexible couplings into a complete operating vacuum cooling plant, and valve means for venting the interior of said chambers to the atmosphere, said valve means including a valve system for utilizing pressure differentials between the said cooling chambers.

6. A substantially, self-contained mobile produce vacuum cooling plant wherein the components thereof are permanently mounted on pneumatic-tired wheeled trailers for separate and independent unitary transport, comprising in combination, one or more vacuum cooling chamber components having power driven means for feeding, loading and removing produce, water cooling components, a vacuum component having both mechanical and steam vacuum apparatus, condenser means operable with said vacuum apparatus for recovery of the moisture and exhaust steam and returning the same to the steam generator as make-up water, with the excess going to the water cooling components, and a power component having both steam and electric generators using identical fuel and carrying its own fuel and water storage, each of said components having suitable connections and flexible couplings carried thereon so that when the components are placed in juxtaposition they can be joined by said flexible couplings into a complete operating vacuum cooling plant, and valve means for venting the interior of said chambers to the atmosphere, said valve means including a valve system for utilizing pressure differentials between the said cooling chambers.

7. In a highway mobile plant for vacuum cooling produce having mobile separate components including a vacuum cooling chamber for produce, water cooling means, self-contained power means, and horizontal vacuum producing means, all provided with detachable interconnecting means for connecting said components together for operation as a complete vacuum cooling plant, wherein said vacuum producing means is a two stage vacuum component the first stage of which is capable of reducing the atmospheric pressure in said cooling chamber to about 28 inches of mercury vacuum measure (based upon a 30″ standard barometer) and the second stage of which is capable of further reducing the atmospheric pressure in said cooling chamber to between 28 to 29.9 inches of mercury vacuum measure (based upon a 30″ standard barometer).

8. In a highway mobile plant for vacuum cooling produce and the like having mobile separate components including a cooling chamber for produce, water cooling means, self-contained power means, and horizontal vacuum producing means, each provided with suitable detachable connecting means for connecting said components together for operation as a complete vacuum cooling plant, wherein said vacuum producing means is a two stage vacuum component the first stage of which is capable of reducing the atmospheric pressure in said cooling chamber to about 28 inches of mercury vacuum measure (based upon a 30″ standard barometer) and a second stage of which includes steam-jet pumps to further reduce the atmospheric pressure in said cooling chamber to between 28 to 29.9 inches of mercury vacuum measure (based upon a 30″ standard barometer), and condenser means for the condensation of the moisture from the cooling chamber and exhaust steam from said vacuum component.

9. The construction of the horizontal vacuum producing component of claim 8 further characterized by means for operatively employing said second stage while said first stage is in operation and prior to the completing its function.

10. The construction of the horizontal vacuum producing component of claim 8 including mechanical vacuum means for said first stage.

11. The construction of claim 6 wherein said independent power means is capable of delivering steam sufficient to operate said steam jet pumps, and is capable of withstanding damaging vibrations incurred by highway travel.

References Cited in the file of this patent

UNITED STATES PATENTS

| | | |
|---|---|---|
| 257,506 | McMillan | May 9, 1882 |
| 1,246,817 | Jones | Nov. 13, 1917 |
| 2,111,905 | Smith | Mar. 22, 1938 |
| 2,621,492 | Beardsley et al. | Dec. 16, 1952 |
| 2,634,592 | Beardsley | Apr. 14, 1953 |
| 2,963,876 | Hibbs | Dec. 13, 1960 |